H. WOLF.
Adjusting Screw for Winnowers.
No. 64,728.  Patented May 14, 1867.
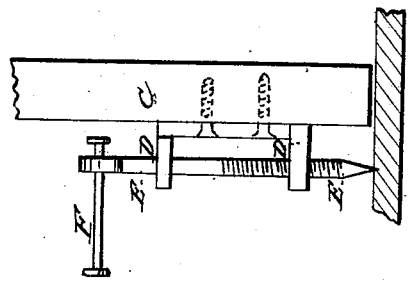
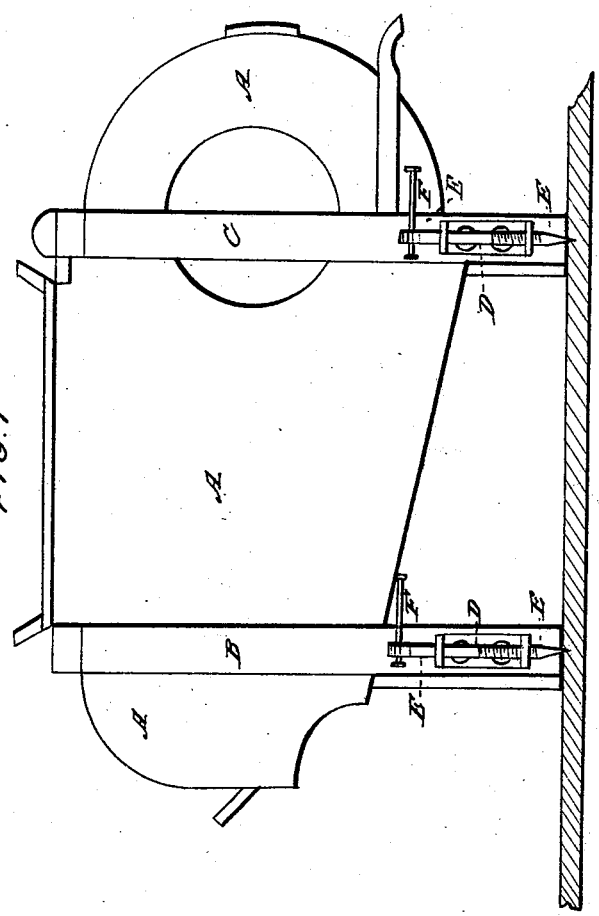
WITNESSES:  INVENTOR:

United States Patent Office.

HERMAN WOLF, OF AVON, PENNSYLVANIA.

Letters Patent No. 64,728, dated May 14, 1867.

ADJUSTING-SCREW FOR THE LEGS OF FANNING-MILLS.

*The Schedule referred to in these Letters Patent and making part of the same.*

TO ALL WHOM IT MAY CONCERN:

Be it known that I, HERMAN WOLF, of Avon, in the county of Lebanon, and State of Pennsylvania, have invented a new and improved Attachment for Fan-Mills and other machines; and I do hereby declare that the following is a full, clear, and exact description thereof, which will enable others skilled in the art to make and use the same, reference being had to the accompanying drawings, forming part of this specification, in which—

Figure 1 is a side view of a fan-mill with my improvement attached.

Figure 2 is a detail view, showing more clearly the manner in which it is attached.

Similar letters of reference indicate like parts.

My invention has for its object to furnish an improved device for attachment to fan-mills and other machines, to hold them steady and in their places while being used, and by means of which they may be adjusted and held steadily even upon an uneven floor; and it consists in attaching screws to one or more of the legs of the machine by means of suitable supports, so that they can be lowered to secure the machine in place while being used, or to adjust it, and raised so as to be out of the way while the machine is being moved from place to place.

A is a fan-mill, to two of the legs B and C of which are attached bars D, the ends of which are bent out at right angles, as shown in the drawings. Through the projecting ends of the bar D are formed holes for the reception of the screw E, in one of which holes a screw-thread is formed, corresponding with the thread of the said screw E. The screws E may be operated by a handle, F, passing through a hole in their upper ends, which may be slipped back and forth to pass the side of the machine. The lower end of the screws E should be made pointed, as shown in the drawings, so as to take hold of the floor to hold the said machine from sliding about, and by turning one of the screws down further than the other the machine may be adjusted in a level position and held steady, however uneven the floor upon which it stands may be. The drawings represent the screws as being applied to two legs of the machine, and that number I prefer, but a greater or less number may be used if desired. The device has been described as being applied to fan-mills, but it is equally applicable to all other machines that stand upon the floor while being operated. When desired, the screws E may be turned up away from the floor, so that the machine may be slid from place to place upon the floor.

I claim as new, and desire to secure by Letters Patent—

The construction and arrangement upon the legs of a fan-mill, or other machine, of the bars D, with their ends bent at right angles, and perforated to receive the adjustable pointed screw E, provided with the handle F, as herein set forth for the purpose specified.

HERMAN WOLF.

Witnesses:
SAMUEL M. PFLEGER,
JOHN CELOUSE.